US012678708B2

(12) United States Patent
Prasetiyo et al.

(10) Patent No.: US 12,678,708 B2
(45) Date of Patent: Jul. 14, 2026

(54) DISTILLATION COLUMN MINIMUM FLOW ARRANGEMENT

(71) Applicant: SAUDI ARABIAN OIL COMPANY, Dhahran (SA)

(72) Inventors: Soelistiono Koesoemo Prasetiyo, Abqaiq (SA); Ibrahim Saeed Alghamdi, Abqaiq (SA); Moath Khalid Almansour, Abqaiq (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 274 days.

(21) Appl. No.: 18/303,876

(22) Filed: Apr. 20, 2023

(65) Prior Publication Data

US 2024/0350940 A1      Oct. 24, 2024

(51) Int. Cl.
  *B01D 3/34*      (2006.01)
  *B01D 3/42*      (2006.01)
  *F25J 3/02*      (2006.01)
(52) U.S. Cl.
  CPC ............. *B01D 3/4283* (2013.01); *B01D 3/34* (2013.01); *F25J 3/0209* (2013.01); *F25J 3/0233* (2013.01); *F25J 3/0238* (2013.01); *F25J 3/0242* (2013.01); *F25J 3/0266* (2013.01); *F25J 2200/74* (2013.01)
(58) Field of Classification Search
  CPC .... C07C 7/04–08; F25J 3/0209; F25J 3/0214; F25J 3/0635; F25J 3/064; F25J 3/0233; F25J 3/0238; F25J 3/0242; F25J 3/0247; F25J 3/0266
  See application file for complete search history.

(56) References Cited

U.S. PATENT DOCUMENTS

| | | | | |
|---|---|---|---|---|
| 4,456,460 A | * | 6/1984 | Apffel | F25J 3/0238 62/623 |
| 4,597,788 A | * | 7/1986 | Apffel | F25J 3/0257 62/623 |
| 4,600,421 A | * | 7/1986 | Kummann | C07C 7/04 62/621 |
| 4,675,035 A | * | 6/1987 | Apffel | F25J 3/0209 62/929 |
| 4,738,699 A | * | 4/1988 | Apffel | F25J 3/0209 62/623 |
| 5,030,339 A | * | 7/1991 | Czarnecki | F25J 3/0247 208/353 |

(Continued)

OTHER PUBLICATIONS

"What are natural gas liquids and how are they used?", U.S. Energy Information Administration, Apr. 20, 2012, https://www.eia.gov/todayinenergy/detail.php?id=5930.*

*Primary Examiner* — Jonathan Luke Pilcher
(74) *Attorney, Agent, or Firm* — Osha Bergman Watanabe & Burton LLP

(57)      ABSTRACT

A distillation system operating below minimum flow. The distillation column is configured for separating a mixed feed into one or more fractional mixtures, producing an overhead product and a bottom product. A bottom return line is provided for returning at least a portion of the bottom product to supplement the mixed feed to the distillation column. A control valve is configured for controlling a flow rate in the bottom return line. A feed surge drum is configured for receiving a feed from the bottom return line and fresh feed, producing the mixed feed.

9 Claims, 1 Drawing Sheet

(56)          References Cited

U.S. PATENT DOCUMENTS

|  |  |  |  |  |
|---|---|---|---|---|
| 7,216,507 | B2 * | 5/2007 | Cuellar | F25J 3/0233 |
|  |  |  |  | 62/620 |
| 9,777,960 | B2 * | 10/2017 | Currence | F25J 3/0242 |
| 11,905,480 | B1 * | 2/2024 | Khan | C10L 3/103 |
| 12,157,865 | B2 * | 12/2024 | Khan | B01D 3/346 |

* cited by examiner

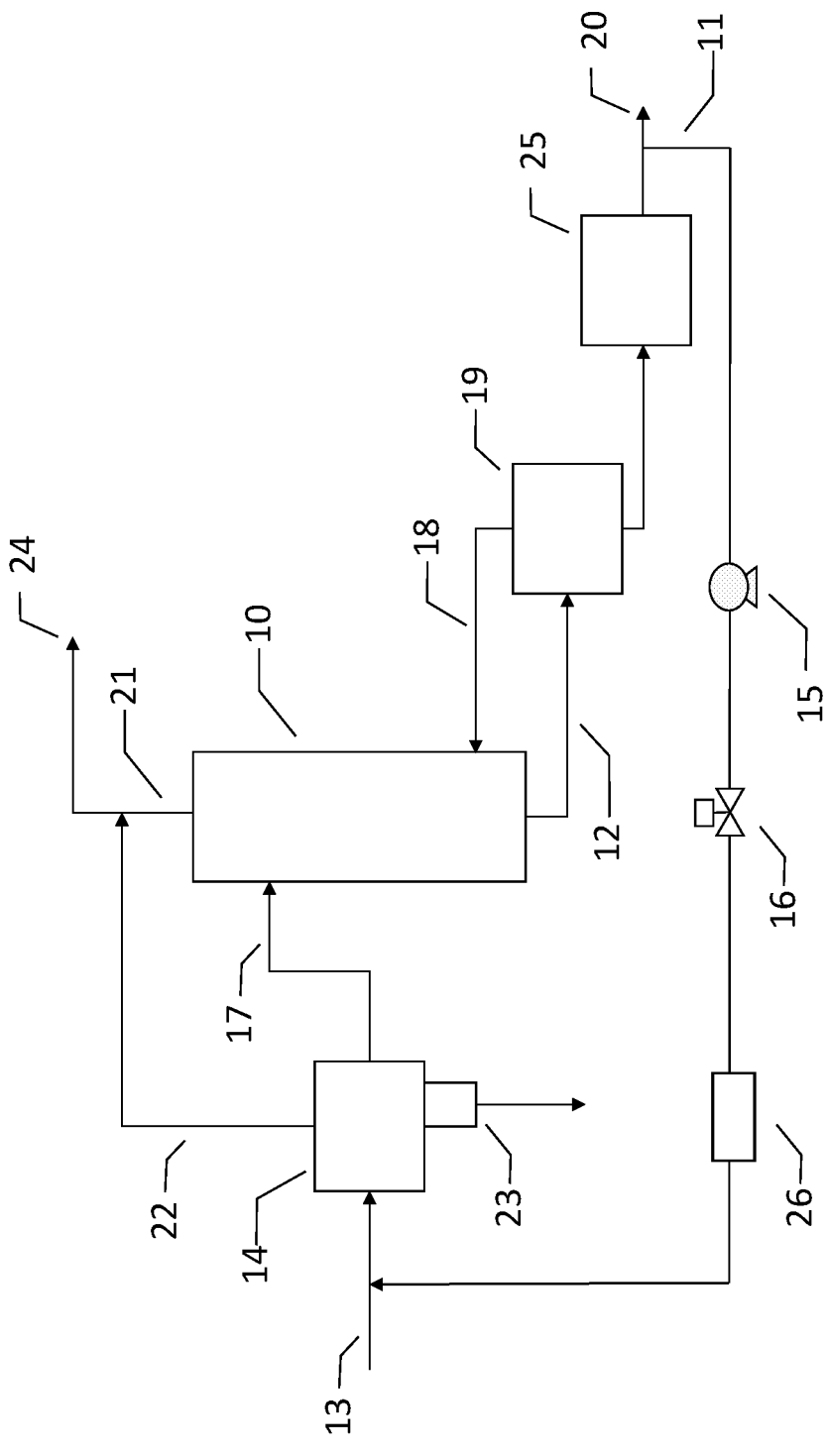

DISTILLATION COLUMN MINIMUM FLOW ARRANGEMENT

BACKGROUND

Distillation columns are often expected to operate outside of the range of their original design during upsets or planned changes in production. The necessary flexibility in performance can be obtained through the use of mass transfer internals that offer a high turndown, or the ability to maintain efficiency over a broad range of flow rates. However, upgrading mass transfer equipment can be cost prohibitive, especially for intermittent or rare occurrences when adequate feed is not available.

As an example, natural gas liquids (NGL) produced from gas compression trains are sent to strippers to stabilize the product by removing ethane, methane, and light contaminants, such as $CO_2$ and $H_2S$. NGL stripper units are susceptible to unplanned but significant disruptions in feed availability, due to upstream production issues. These units are designed for a broad range of operations but cannot handle unusual production scenarios with exceptionally low feed rates.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect of the embodiments disclosed are related to a distillation system operating below minimum flow. The distillation column is configured for separating a mixed feed into one or more fractional mixtures, producing an overhead product and a bottom product. A bottom return line is provided for returning at least a portion of the bottom product to supplement the feed to the distillation column. A control valve is configured for controlling a flow rate in the bottom return line. A feed surge drum is configured for receiving a feed from the bottom return line and fresh feed, producing the mixed feed.

In another aspect, embodiments disclosed herein relate to a distillation system configured as an NGL stripper, including a minimum flow arrangement with a bottom return line for operating below minimum flow. The distillation system includes a distillation column configured for separating a mixed feed of NGL into one or more fractional mixtures, producing an overhead product and an NGL bottom product. A bottom return line is configured for returning at least a portion of the NGL bottom product to a feed surge drum, and a control valve configured for controlling a flow rate in the bottom return line. The feed surge drum is configured for receiving a feed and a portion of the bottom product from the bottom return line, producing the mixed feed of NGL.

Other aspects and advantages of the claimed subject matter will be apparent from the following description and the appended claims.

BRIEF DESCRIPTION OF DRAWINGS

The following FIGURE is included to illustrate certain aspects of the embodiments, and should not be viewed as exclusive embodiments. The subject matter disclosed is amenable to considerable modifications, alterations, combinations, and equivalents in form and function, as will occur to those skilled in the art and having the benefit of this disclosure.

FIG. 1 illustrates a process flow diagram of a distillation column with the minimum flow arrangement according to one or more embodiments herein.

Other aspects and advantages of the claimed subject matter will be apparent from the following description and the appended claims.

DETAILED DESCRIPTION

In one aspect, embodiments disclosed herein relate to a distillation column minimum flow arrangement that would enable continued operation during unusual circumstances when the available product to feed the unit is too low to support efficient operations. The proposed minimum flow arrangement compensates by recycling bottom product back into the feed to maintain adequate internal loading of the column. This approach was initially developed for natural gas stripping (NGL) stripping columns with potential application to other distillation columns when minimum flow cannot be achieved in unusual circumstances, such as a depropanizers, debutanizers, etc.

Distillation column design, including the selection of trays and other internals, is based on the process requirements for all expected operating scenarios. However, production facilities periodically experience scenarios when the feed rates are outside of the original design envelope. During such periods of low feed rate, loading of distillation column internals (e.g., trays, packings, etc.) becomes too low to maintain separation efficiency. Regardless, a practical system alternate is needed to continue operation even when production rates are exceptionally low.

Operating a column below the designed minimum flow rate results in the inability to meet product specifications because of poor separation efficiency. In many cases it is possible to use more advanced internals (e.g., moving valve trays, bubble cap trays, etc.) that offer a broader range of turndown performance. However, upgrading column internals can be cost prohibitive and/or unattractive due to other design considerations, such as fouling. The proposed minimum flow configuration is a cost-effective option requiring simple modifications with piping, pumps, and valves, as an alternative to complex upgrades to the distillation internals.

FIG. 1 shows a simplified schematic of a conventional distillation column [10] configured as an NGL stripper unit. As part of natural gas liquids processing plants, distillation columns, known as condensate strippers, remove lighter components, including methane, ethane and impurities (i.e., $CO_2$, $H_2S$ and etc.) from the C3+ NGL product. Hydrocarbon condensates coming from a natural gas compression train are fed to stripping columns either as a direct feed, or from multiple production units. The NGL product is separated as the bottom product [12], then sent to a bottom product cooler [25] and transported under system pressure to refining facilities through a bottom product line [20].

The liquid feed [13] is partially stabilized in the feed surge drum [14] before being transferred to the distillation column [10]. The feed surge drum [14] is equipped with a vent line [22] to remove a portion of the methane, ethane and lighter gases to be sent to the overhead vapor line [21] and combined with the column overhead product [24]. The surge drum sump [23] is used to collect and remove any aqueous or emulsion phases that fall out of the liquid feed [13].

Liquid drawn from the column bottom product [12] is heated in the reboiler [19] to generate hot vapor return [18]

that is redistributed near the bottom of the column. The hot vapor return [18] is used as a stripping medium in the distillation column [10]. The hot rising vapor heats liquid flowing downward through the column and carries light components to the top of the column, where it is collected in the overhead vapor line [21]. In an NGL stripper, the light components of the overhead product [24] include methane, ethane and contaminants, such as $CO_2$ and $H_2S$.

Contents of the overhead product [24] are sent to one or more downstream process. A portion of the overhead product [24] may also be cooled and returned to the column as reflux (not shown). NGL overhead product [24] may be sent to gas treating units to recover methane and ethane and remove impurities, such as $CO_2$ and $H_2S$.

The bottom product [12] is taken from the column sump and sent to the reboiler [19]. At least a portion of the bottom product [12] is taken from the reboiler [19] sump to the bottom product cooler [25] and transferred through the bottom product line [20] to one or more downstream processes. The bottom product [12] from an NGL stripper is composed of a C3+ mixture of natural gas liquids.

A portion of the bottom product [12] is taken downstream of the bottom product cooler [25] to a bottom return line [11]. The bottom return line [11] is configured to facilitate the minimum flow arrangement in which a portion of the bottom product is mixed with the feed [13] prior to, or in, the feed surge drum [14] during minimum flow scenarios. Addition of the recycled bottom product with the available feed increases liquid loading for the mass transfer internals (e.g., trays, packings and etc.) to maintain separation efficiency. A bottom return pump [15] and control valve [16] may be used to control the return of a portion of bottom product to the feed surge drum [14] at operating pressure. The feed surge drum [14] may be operated a pressure in the range of 350-375 psig while the pressure in the bottom return line [11] may be at a pressure in the range of 380-420 psig. Accordingly, in some embodiments, the bottom return pump [15] may not be needed as the pressure of the hydrocarbon stream exiting the bottom product cooler [25] may be higher than the feed pressure of the feed surge drum [14]. Similarly, in some embodiments, the feed surge drum [14] may be operated at a temperature in the range of 100-130° F. while the temperature in the bottom return line [11] may be in the range of 140-160° F.

The operating pressure of the feed surge drum [14] is in the approximate range of 350-375 psig, whereas the bottom product [12] pressure is 380-420 psig. Therefore, a bottom return pump [15] may not be required. A bottom return cooler [26] may be used to bring the temperature of the recycled bottom product [12] to approximate feed temperature and avoid flashing in the feed surge tank [14]. The temperature of the feed surge drum [14] ranges from 100 to 130° F., whereas the bottom product temperature is 140-160° F.; hence, the bottom return cooler [26] may be required. A bottom return cooler [26] may not be necessary if the performance of the distillation column [10] is suitable with a slight variation in vapor traffic.

The amount of bottom product [12] returned to the feed [13] must be sufficient to meet the minimum design flow rate of the distillation column [10]. The operating range largely depends on the available turndown, or the ratio of the maximum vapor load to the minimum vapor load, for efficient mass transfer. For example, columns with sieve trays typically allow for a 2:1 turndown, while more expensive valve trays or bubble-cap trays offer turndown ratios of around 4:1 and 10:1, respectively. The operating range for trays also depends on the ability to maintain the cross flow of liquid and downcomer seal at a given liquid load. A minimum liquid load over the outlet weir of at least 2 gallons per minute (gpm) per inch of weir length (i.e., 18 m³/m/h) is commonly used as a benchmark. Therefore, the bottom product return line [11], bottom return pump [15], and control valve [16] should be sized to provide a minimum flow rate. That is, high enough to operate in combination with the feed [13] above the minimum vapor turndown rate and minimum liquid weir loading for the system.

Reboiler circuits are designed to operate with enough steam, or another heat transfer medium, to generate sufficient vapor traffic, or boil up, internal to the column to operate within the design envelope. Additional modifications to the reboiler [19] and auxiliary equipment should not be necessary for the minimum flow arrangement, as long as the minimum liquid rates for reboiler circuits are taken into consideration. Any additional liquid in the reboiler [19] can be removed by the bottom product line [20] to be cooled and sent to one or more process downstream.

Embodiments of the present disclosure may provide at least one of the following advantages. The distillation column minimum flow arrangement eliminates the need to replace the distillation column trays, and other internals, with more sophisticated and/or expensive options to allow operation when it is necessary to significantly reduce the feed rate. The proposed concept can be applied as a retrofit to extend operations, as well as an option for greenfield or brownfield projects, where significant capital cost saving can be achieved through selection of simple, low cost distillation column internals. The minimum flow arrangement can be implemented through simple modifications with piping, pumps, and valves, as an alternative to complex upgrades to the distillation internals and auxiliary equipment.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed:

1. A distillation system comprising:
   a distillation column configured for separating a mixed feed into one or more fractional mixtures, producing an overhead product comprising methane, ethane, carbon dioxide, hydrogen sulfide, or combinations thereof and a bottom product;
   a bottom return line configured for returning at least a portion of the bottom product to supplement a fresh feed;
   a control valve configured for controlling a flow rate in the bottom return line;
   a feed surge drum configured for receiving the fresh feed and the bottom product from the bottom return line, producing the mixed feed;
   a vent line connected to the feed surge drum for venting one or more components comprising methane, ethane, carbon dioxide, or hydrogen sulfide from the feed surge drum; and
   an overhead vapor line connected to the vent line for collecting and combining the overhead product comprising methane, ethane, carbon dioxide, hydrogen sulfide, or combinations thereof directly produced from a top of the distillation column and the one or more components in the vent line directly from the feed surge drum.

2. The system of claim 1 further comprising:

a reboiler configured for heating at least a portion of the distillation column bottom product, to generate a hot vapor return;

a hot vapor return line configured for redistributing the hot vapor from the reboiler to the distillation column as a stripping medium and;

a bottom product cooler, and wherein the bottom return line is configured for transferring at least a portion of the bottom product from the bottom product cooler to the feed surge drum as the bottom product.

3. The system of claim 1, further comprising:

a feed surge drum sump configured for removing an aqueous or emulsion phase from the feed surge drum.

4. The system of claim 1, wherein;

a bottom product cooler is configured to reduce a temperature of the bottom product before it is mixed with the fresh feed.

5. The system of claim 1, wherein;

at least a portion of the overhead product is cooled and returned to the distillation column as reflux.

6. A distillation system configured as an NGL stripper, comprising:

a distillation column configured for separating a mixed feed of NGL into one or more fractional mixtures, producing an overhead product comprising methane, ethane, carbon dioxide, hydrogen sulfide, or combinations thereof and an NGL bottom product;

a bottom return line configured for returning at least a portion of the NGL bottom product to a feed surge drum;

a control valve configured for controlling a flow rate in the bottom return line;

wherein the feed surge drum is configured for receiving a fresh feed and a portion of the bottom product from the bottom return line, producing the mixed feed of NGL;

a vent line connected to the feed surge drum for venting one or more components comprising methane, ethane, carbon dioxide, or hydrogen sulfide from the feed surge drum; and an overhead vapor line connected to the vent line for collecting and combining the overhead product comprising methane, ethane, carbon dioxide, hydrogen sulfide, or combinations thereof directly produced from a top of the distillation column and the one or more components directly from the feed surge drum.

7. The system of claim 6 further comprising:

a reboiler configured for heating a portion of the NGL bottom product;

a hot vapor return line configured for returning a hot vapor from the reboiler to the distillation column as a stripping medium; and a bottom product cooler, and wherein the bottom return line is configured for transferring a portion of NGL bottom product from the bottom product cooler to the feed surge drum as the bottom product.

8. The system of claim 6, further comprising:

a feed surge drum sump configured for removing an aqueous phase or emulsion phase from the feed surge drum.

9. The system of claim 7, wherein the bottom product cooler is configured to reduce a temperature of the NGL bottom product return line.

\* \* \* \* \*